A. KLÖNNE.
Apparatus for the Purification of Coal Gas.

No. 231,177. Patented Aug. 17, 1880.

A. KLÖNNE.
Apparatus for the Purification of Coal Gas.

No. 231,177.

3 Sheets—Sheet 2.

Patented Aug. 17, 1880.

A. KLÖNNE.
Apparatus for the Purification of Coal Gas.

No. 231,177. Patented Aug. 17, 1880.

UNITED STATES PATENT OFFICE.

AUGUST KLÖNNE, OF DORTMUND, PRUSSIA.

APPARATUS FOR THE PURIFICATION OF COAL-GAS.

SPECIFICATION forming part of Letters Patent No. 231,177, dated August 17, 1880.

Application filed August 22, 1878. Patented in Germany October 20, 1877, and in England November 9, 1877.

*To all whom it may concern:*

Be it known that I, AUGUST KLÖNNE, engineer, of Dortmund, Prussia, have invented certain Improvements in the Apparatus for the Purification of Coal-Gas, of which the following is a specification.

This invention relates to improvements in the arrangement of the scrubber and the purifier as used in gas-works for the purification of coal-gas; and the object of the same is to construct these apparatus in such a manner that the solid material which they contain may be extracted and fresh material introduced without interruption of the scrubbing or the purifying process, and without loss of gas, so that no change of apparatus is required during the regular continuation of the working.

On the annexed sheets of drawings these improved apparatus are represented in different views.

Figure 1:
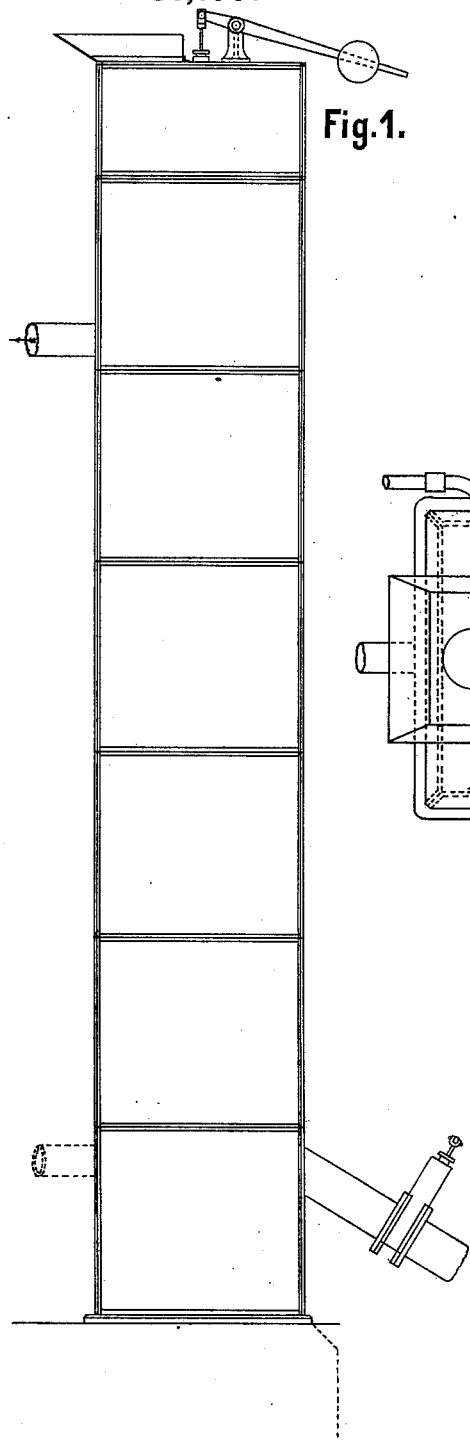
Figure 3:
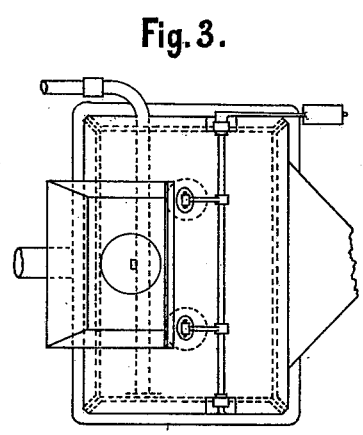
Figure 2:
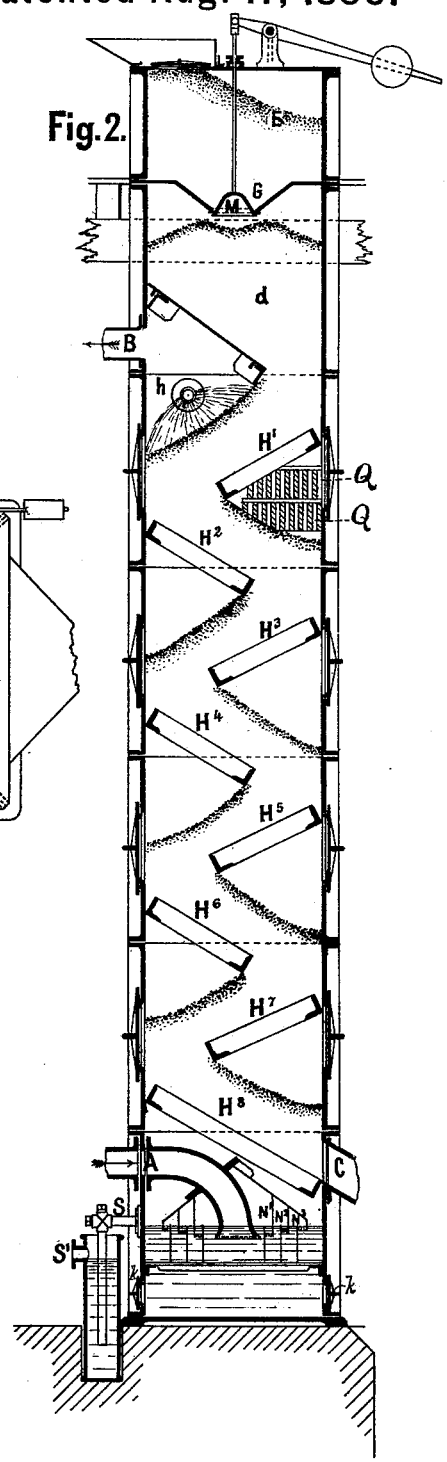
Figure 10:
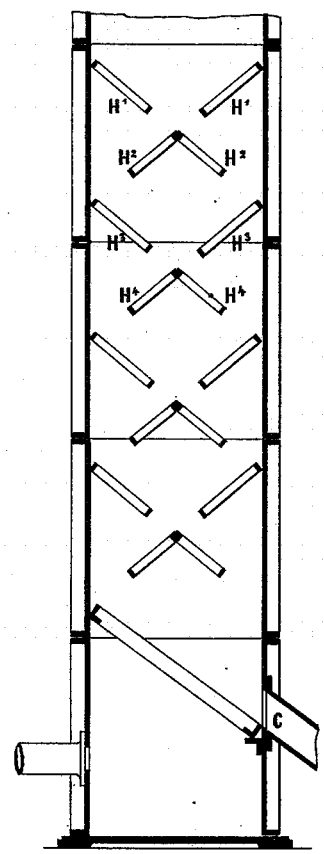
Figure 11:
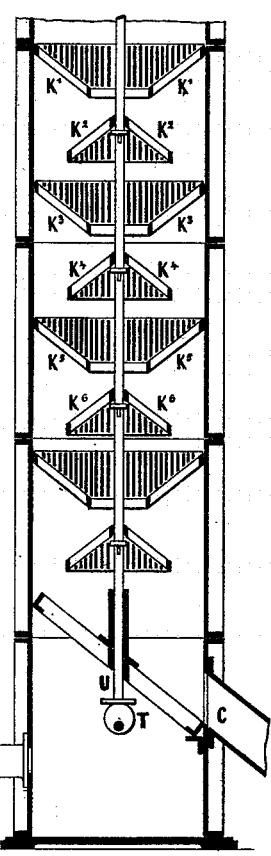
Figure 12:
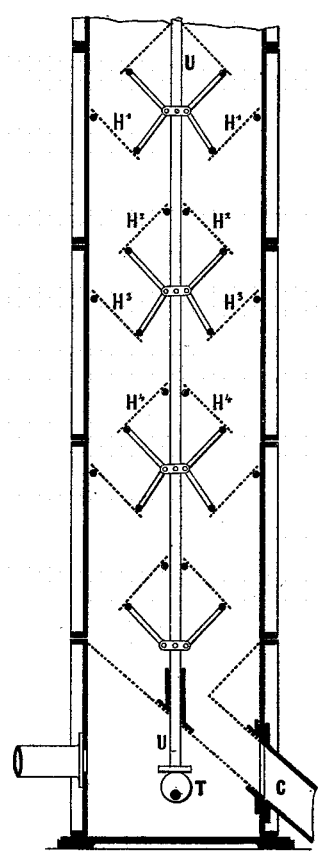
Figure 4:
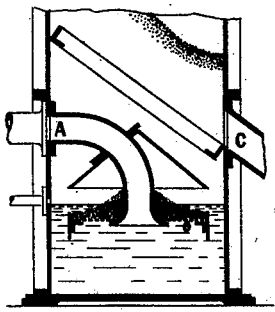
Figure 5:
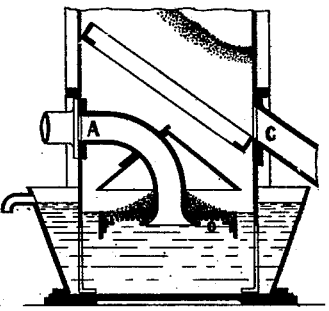
Figure 6:
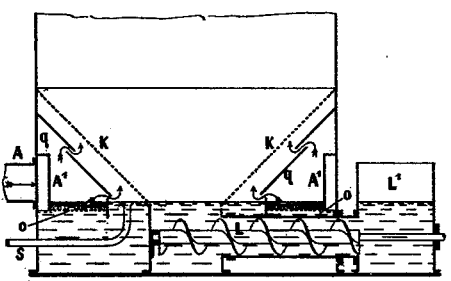
Figure 7:
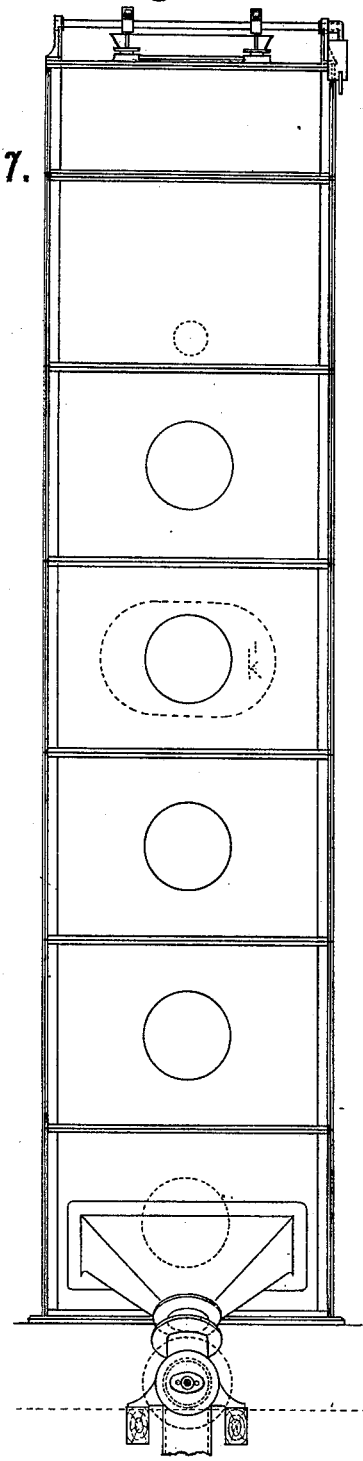

Figure 1 is a side view, Fig. 2 a vertical section, and Fig. 3 a ground plan, of the scrubber, while Figs. 4, 5, and 6 represent modifications of a part of the same. Fig. 7 is a front view, Fig. 8 a vertical section, and Fig. 9 a horizontal section, of the purifier. Figs. 10, 11, and 12 show modified arrangements of the grates or hurdles.

The main features of the improvements in the scrubber and the purifier are the same. The gravel, coke, or other material through which the gas passes in the scrubber, or the lime, oxide of iron, Lamming's compound, &c., used in the purifier, is placed on inclined grates, hurdles, or sieves $H'$ $H^2$ $H^3$, &c., Figs. 2, 8, and 9, arranged one above the other in either of the said apparatus. The hurdles, &c., are inclined at a suitable angle alternately to the right and the left, so that the material lying on them has a tendency to slide thereon. Their upper end is in close proximity to the corresponding wall of the apparatus, while the lower end, with the exception of the end of the bottom hurdle, is at some distance from the opposite wall.

Figure 8:
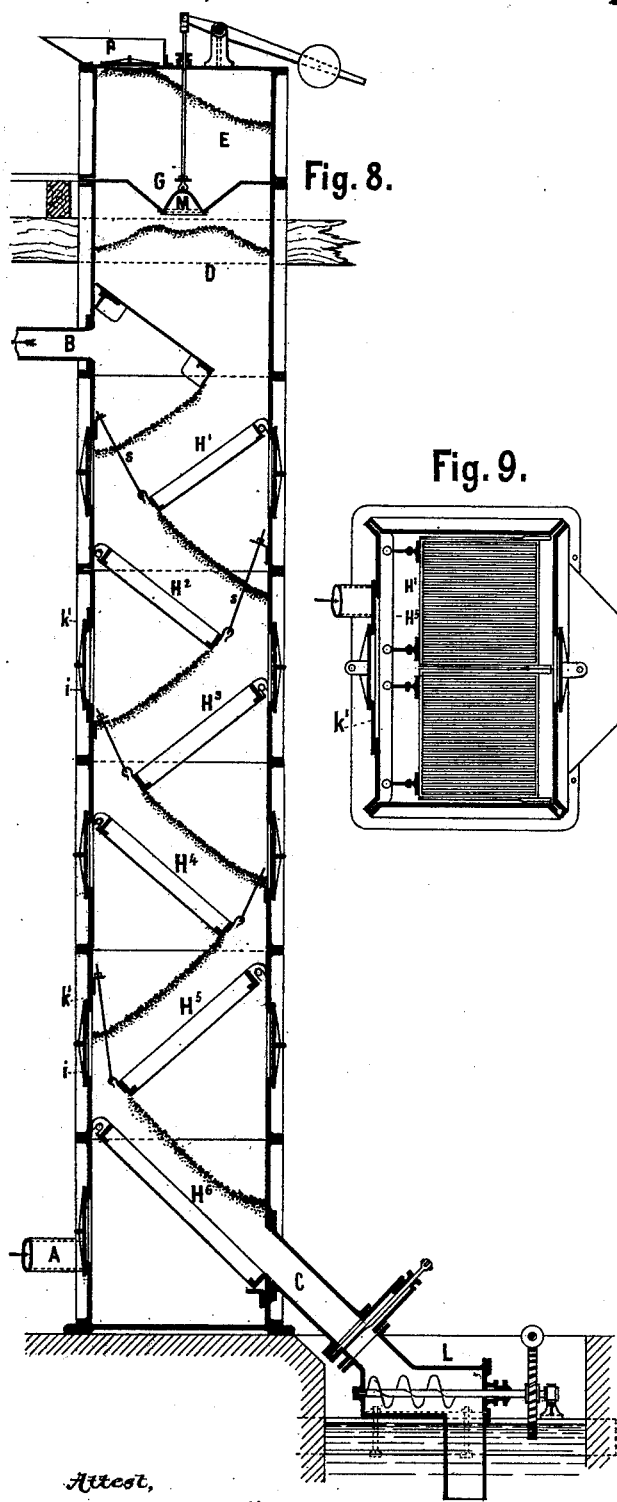

At the end of the lowest hurdle an inclined tube, C, Figs. 2 and 8, provided with a slide-valve, is attached to the apparatus for discharging the spent material. Supposing this valve to be closed, the material will bear against it, thereby being retained on the hurdle $H^6$, Fig. 8. The layer on the next hurdle, $H^5$, rests at the end partly on the material at the top of the hurdle $H^6$, and partly bears against the wall of the apparatus, and is consequently also prevented from slipping down as long as the slide-valve is closed. The same is the case with the layers on the other hurdles. As soon, however, as the slide-valve is opened the material at the bottom, which is spent, or which has otherwise become unfit for further use, slides out, whereupon the layers on all the hurdles descend, one immediately after the other, until the valve is closed again.

Instead of discharging the material at intervals by means of the described slide-valve, a creeper or conveyer, L, which is kept in slow rotation by machinery, may be employed in either apparatus. An escape of gas is in this case prevented by letting the discharge-pipe dip into water, as shown by Fig. 8.

For the purpose of filling up fresh material a reservoir, E, Figs. 2 and 8, is provided at the top of the apparatus, having a funnel-shaped bottom, G, with a valve, M, in the center. This valve is attached by a rod passing through a stuffing-box to a lever with counter-balance-weight, so that it will be closed automatically as soon as the reservoir E is emptied. The cover P of the latter may then be removed without material loss of gas for the purpose of filling the reservoir again. The valve M may, however, be constructed in different ways. It may, for instance, be made flat, and it may be attached to a shaft passing through the side walls of the apparatus, and provided on the outside with a counterbalanced lever. Moreover, two or more valves may be applied.

In the scrubber a conveyer or creeper may be applied for filling fresh material into the apparatus, similar to the one used for discharging, as the feed-opening for the gravel or coke may be kept closed by hydraulic means.

Figure 9:
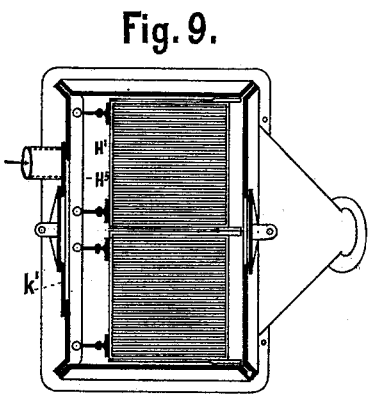

In the side walls of the apparatus there are a number of doors, $i\ i$, for the purpose of examining the grates or for regulating their inclination by means of the screws $s$, Fig. 8; also, larger openings, which are closed by the covers $k'$, Figs. 7, 9, may be provided for facilitating the introduction and the removal of grates.

For removing the impurities from gas an apparatus has been patented in which the gas is conducted so as to accumulate in a volume between a body of water and a perforated strainer, thence passing upward through the strainer and a mixture of lime and fuller's earth sprinkled upon the upper surface of the strainer into the retort. Such an arrangement is illy suited to the purification of coal-gas, and would but partially effect the purpose of my improvements, the essential features of which are that the gas to be purified shall be carried beneath a perforated plate which supports a quantity of gravel or coke, and which is partly or wholly submerged in the ammoniacal liquor, the gas being thus compelled to pass through the submerged gravel or coke, whereby it is brought into intimate contact with the ammoniacal liquor and ridded of the greater part of its impurities.

In my improved scrubber, when used for cleansing coal-gas for lighting purposes, the gas coming from the condenser enters the scrubber by the tube A, Fig. 2. The end of this tube dips into the ammoniacal liquor, which collects in the lower part of the apparatus. The gas being thus forced to pass through the liquor, the latter absorbs sulphureted hydrogen, carbonic acid, and naphthaline, and washes out the carbonate and sulphate of ammonia, as well as compounds of cyanogen, &c., contained in the gas, and also retains particles of tar which the gas may have carried over.

For the purpose of keeping the gas for a longer time in contact with the ammoniacal liquor, and of distributing it within the same, the end of the tube A may be surrounded by several annular chambers, $N^1 N^2 N^3$, Fig. 2, open at the bottom, so that the gas has to pass underneath the edge of all the partition-walls of these chambers. Into the spaces between the said walls other annular walls may project from below for making the course of the gas yet more circuitous. I prefer, however, to use the arrangement shown by Figs. 4 and 5 for distributing the gas within the ammoniacal liquor. The same consists of a perforated plate, $o$, through the center of which the gas-inlet pipe A passes from above, and which is covered with a layer of gravel or coke, partly or entirely submerged in the liquor, so as to increase the number of contact-points between the latter and the gas.

For larger scrubbers, especially when made of cylindrical shape and provided with conical grates, as will be explained hereinafter, the modified arrangement of Fig. 6 may be applied. The perforated plate $o$, on which the gravel or coke lies, is in this case annular. The gas passes from tube A into the circular distributing-channel A'; thence through the perforations of plate $o$ and the layer of gravel or coke, and is thus brought into intimate contact with the fluid in which the said layer is submerged.

The further course of the gas through the annular spaces between and under the screens $b$ is indicated in the drawings by arrows. These screens serve to prevent an undue accumulation on plate $o$ of gravel, &c., which may fall through the inclined grate K.

By means of this filtering arrangement the gas is freed from about sixty per cent. of the ammonia and from the greater part of the tar which it contains. The same thus constitutes a very valuable accessory part of the scrubber.

S, Fig. 2, is an overflow-pipe, which forms, together with the tube S', a siphon, for the purpose of keeping the liquor within the apparatus always at the same level without allowing any gas to escape. This arrangement may be modified according to Fig. 5.

After having traversed the ammoniacal liquor the gas passes upward through the different layers of coke or gravel, which are kept impregnated with water, and is thereby freed from the residual ammonia on the usual principle; but as in the ordinary arrangement the layers of coke or gravel remain at rest, the tar deposited from the gas forms at last prejudicial obstructions in the interstices between the pieces of coke or the stones. According to this invention, however, the layers of coke or gravel being moved and stirred either at intervals or continuously, the formation of obstructions is prevented, and the deposited tar is more or less rubbed off by the friction of the pieces of coke or the stones among each other, so that the water, percolating the layers, may carry it away. The efficiency of the apparatus is consequently always maintained uniform, and neither the extraction of the material which has become unfit for further use nor the filling in of fresh material causes an interruption of the scrubbing process. Through tube $h$ pure water is introduced.

A second tube may be attached at any point between the gas-inlet and the gas-discharge pipe, for the purpose of admitting a certain quantity of the ammoniacal liquor deposited in the hydraulic main or the condensers, so as thereby to absorb as much as possible the carbonic acid, the sulphureted hydrogen, &c., of the gas; or two scrubbers may be combined, into one of which ammoniacal liquor is admitted at the top and into the other pure water.

On account of the perfect distribution of the water and the gas in the layers of coke the quantity of pure water required for cleansing the gas from ammonia is not more than one cubic foot for ten thousand cubic feet of gas. A very strong ammoniacal liquor is thus obtained, which is especially adapted for purifying the gas from sulphureted hydrogen, carbonic acid, and the different salts mentioned above.

The spaces formed between each grate and the layers of gravel, &c., on the next lower grate are with advantage filled up by rows of thin boards Q Q, placed vertically, with spaces between them, and supported by ledges or in any other suitable manner. These boards serve to increase the scrubbing-surface. Instead of boards, brushwood or other similar material may be used for the same purpose, but the former are to be preferred.

$k\ k$ are doors for cleaning the bottom of the apparatus and for taking out gravel which may have fallen through the lowest grate.

As has already been stated, the purifier represented by Figs. 7, 8, and 9, agrees in its main features with the scrubber, the difference in design being that there is no washing apparatus at the bottom and that no water is admitted, the purifying material being applied in its dry state, as usual.

As it is of advantage to have means for adapting the incline of the grates to the nature of the purifying material applied in any particular case, the regulating-screws $s$ have been introduced and the grates are hinged at their upper end. It may, moreover, be observed that it is to be preferred to give to the lower grates a greater inclination, so as to cause the purifying material, which becomes damp during the process, and consequently less permeable for the gas, to lie in a thinner layer on these grates than near the top, where it is dry.

The gas enters the apparatus through tube A and leaves it at the top by tube B. The extraction of the spent material at the bottom has in this case a similar influence as with the scrubber. The material on the grates is constantly stirred, so that its particles are brought in contact with the gas from all sides. It is therefore utilized in a more profitable manner, and no obstructions to the passage of the gas can be formed.

The arrangement of the grates or sieves may be modified in different manners both in the scrubber and the purifier. In the first instance the grates may be arranged in pairs, so that two grates, $H'\ H'$, Fig. 10, are attached opposite to each other to the walls of the apparatus, while the next pair, $H^2\ H^2$, forms a saddle in the middle of the apparatus, the following grates, $H^3\ H^3$, being again arranged in the same manner as $H'\ H'$, &c. Secondly, instead of the two grates $H'\ H'$ converging toward each other, there may be four grates forming a funnel or inverted frustrated pyramid $K'$, Fig. 11, while for the grates $H^2\ H^2$ an upright pyramid, $K^2$, consisting of four grates, is substituted.

If the apparatus has a polygonal casing these funnels and pyramids will with advantage be made of a corresponding polygonal form, and if the casing is round it is, of course, preferable to apply grates having a conical shape.

It will be seen, however, that in all these different arrangements the essential feature of the invention is maintained, which consists in causing the material to slide down on grates or sieves alternately inclined in opposite directions.

If, in the case of round scrubbers, the spaces between the grates and the layers of material below them are to be filled out by boards, as shown in Fig. 2, these may be bent into cylindrical shape and placed concentrically within each other.

For the purpose of facilitating the descent of the material, if it should clog and adhere to the grates, it is advantageous to provide these with a shaking mechanism such as shown in Fig. 11, where the cones or pyramids $K^2$, $K^4$, &c., are attached to a rod, U, which can be moved up and down by means of a cam, T, provided with suitable shaft and lever, or by any other mechanism answering the same purpose.

In an analogous manner the plain inclined grates $H'$, &c., of Figs. 2 and 8 may be made movable, as represented in Fig. 12. The grates shown in this figure as consisting of perforated plates are provided with journals near the top edge and jointed by connecting-rods $m$ to the vertical rod U, which is moved up and down by any suitable mechanism.

This arrangement may be varied in different manners, and the grates may have an oscillating or a tilting motion, or they may be moved bodily up and down.

The water percolating the layers of coke, &c., and the grates having a tendency to run along the whole length of the grate-bars, it is advisable to provide these bars either with a number of small ledges or with notches on the sides and the bottom, so as to cause the water to drip off from many points of the under surface of the grates, and thereby to insure its uniform distribution in the whole apparatus. If perforated plates are used instead of grates, the burr on the edge of the holes, resulting from the punching, answers the same purpose as the said ledges or notches on the grate-bars.

The described scrubber, besides presenting great advantages for cleansing coal-gas and gases distilled from other materials for lighting purposes, is also particularly useful for the purification of blast-furnace gases from smoke and dust. In this case, however, I prefer to introduce the gas at the top, and to let it pass downward through the layers of gravel or coke, which should be kept thinner than in the first case, so as to reduce the pressure of the gas as little as possible.

The dust and the particles of soot carried over by the gas will be washed out by the water and carried down to the bottom of the apparatus, whence they may be removed through suitable openings. The quantity of water required for this process being but small, the gas is but slightly cooled by the same.

The advantages of the described arrangement of scrubber and purifier are the following:

First. As the coke or gravel in the scrubber or the purifying material in the purifier is extracted and replenished without interruption of the cleansing and purifying process, no change of apparatus is required during the regular continuation of the working. The number of apparatus is consequently reduced, and the complicated center valves or combinations of slide-valves are obviated. The whole arrangement is therefore simpler and cheaper in construction.

Secondly. Less space is required for the apparatus.

Thirdly. The method of operating is cheaper with regard to manual labor.

Fourthly. The loss of gas hitherto caused by the necessity of opening the apparatus for changing the material, and the inconvenience arising therefrom by the diffusion of gas in the rooms of the factory and the neighborhood is avoided.

Fifthly. The inconvenience of hydraulic joints is avoided.

Sixthly. The purifying material is utilized more efficiently.

Seventhly. The ammoniacal liquor obtained from the coal-gas contains a higher percentage of ammonia.

I claim as my invention—

1. The combination, with the outer case of a scrubber or purifier for gas, of the series of purifier grates, hurdles, or sieves alternately inclined in opposite directions, substantially as described.

2. The combination, with the outer case of a scrubber or purifier for gas having a series of purifier grates, hurdles, or sieves alternately inclined in opposite directions, of the reservoir E, having a self-acting valve or valves, M, substantially as described.

3. The combination, with the outer case of a scrubber or purifier for gas having a series of purifier grates, hurdles, or sieves alternately inclined in opposite directions, of the conveyer L, substantially as described.

4. The combination, with the inlet-pipe of a scrubber for gas, of a perforated plate, o, covered with a layer of coke or gravel and submerged in the ammoniacal liquor, substantially as described, and for the purpose stated.

5. The combination, with the inclined grates, hurdles, or sieves of a scrubber or purifier for gas, of the boards Q, substantially as described.

6. The combination, with the grates, hurdles, or sieves of a scrubber or purifier for gas, of a reciprocating rod, U, for shaking the same, substantially as described.

In testimony whereof I have signed my name to this specification in the presence of two subscribing witnesses.

AUG. KLÖNNE.

Witnesses:
L. KLEMPERER,
PAUL DRUCKMULLER,
    *Both of Dresden.*